W. D. GOZA.
AUTO BUMPER AND WHEEL LOCK.
APPLICATION FILED AUG. 9, 1919.
1,362,416. Patented Dec. 14, 1920.
2 SHEETS—SHEET 1.
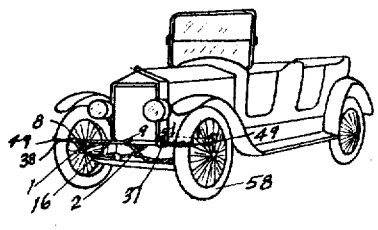
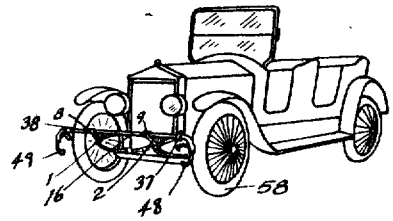
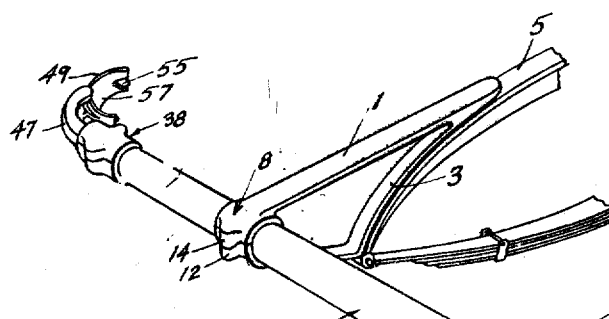
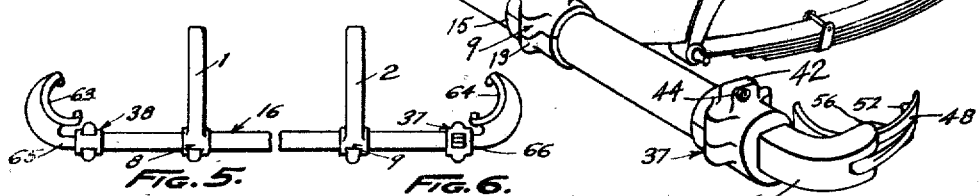
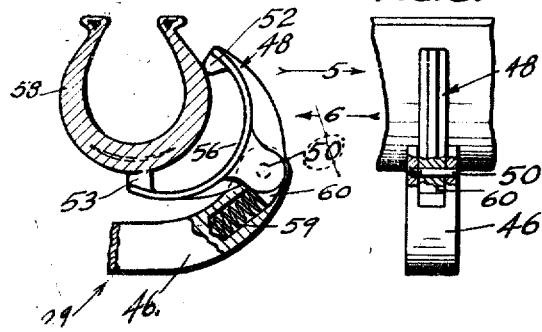
INVENTOR.
WALTER D. GOZA.
BY Hazard & Miller
ATTORNEYS

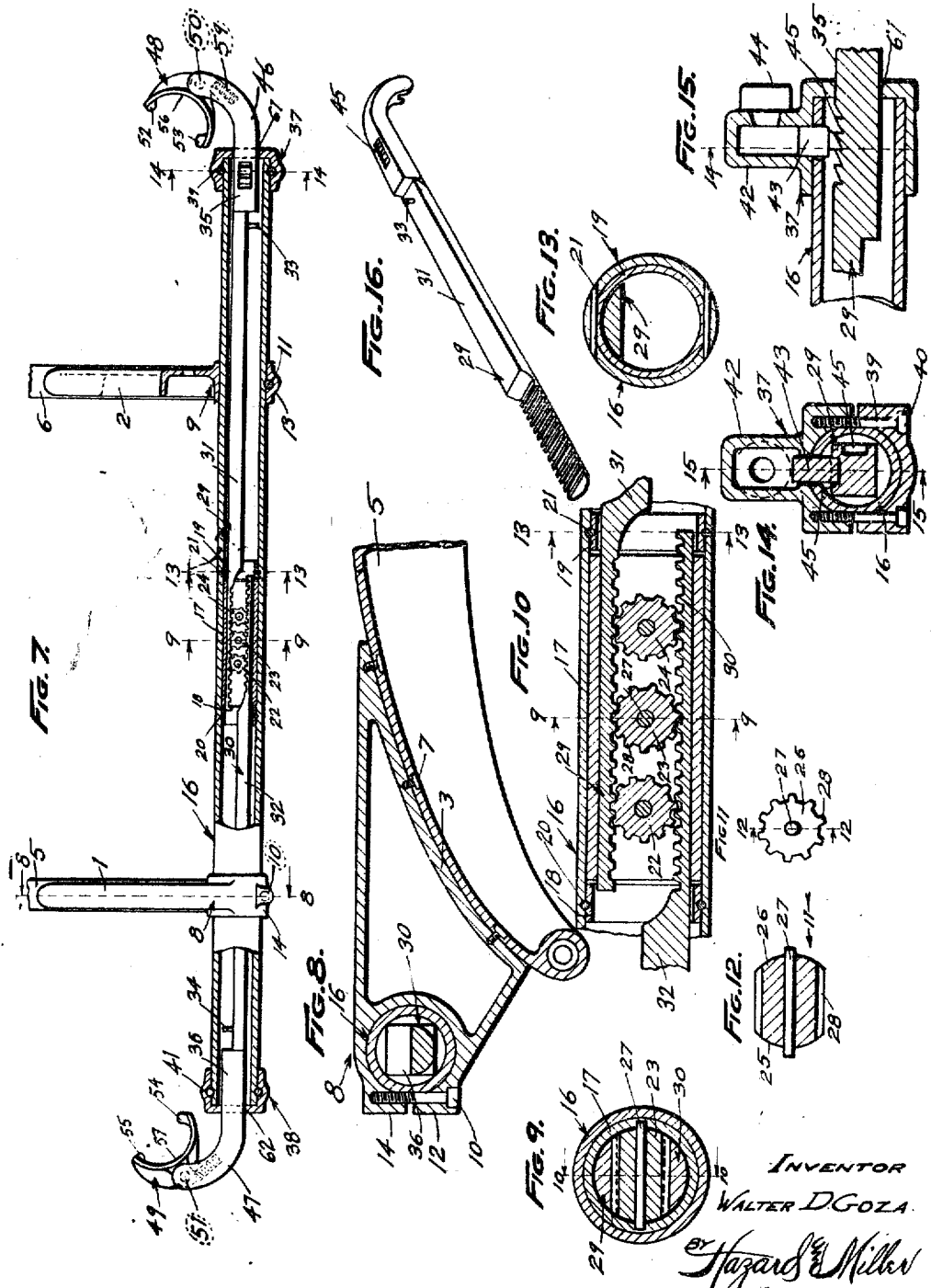

UNITED STATES PATENT OFFICE.

WALTER D. GOZA, OF LOS ANGELES, CALIFORNIA.

AUTO BUMPER AND WHEEL LOCK.

1,362,416.   Specification of Letters Patent.   Patented Dec. 14, 1920.

Application filed August 9, 1919. Serial No. 316,452.

*To all whom it may concern:*

Be it known that I, WALTER D. GOZA, a citizen of the United States, residing at Los Angeles, in the county of Los Angeles and State of California have invented new and useful Improvements in Auto Bumpers and Wheel Locks, of which the following is a specification.

My object is to make an automobile bumper and wheel lock, and my invention consists of the novel features herein shown, described and claimed.

Figure 1 is a perspective of an automobile provided with a bumper and wheel lock in accordance with the principles of my invention, the bumper being in position with the wheels unlocked so that the automobile may run.

Fig. 2 is a view analogous to Fig. 1 and showing the bumper in position to lock the wheels so that the automobile may not run.

Fig. 3 is a fragmentary perspective upon an enlarged scale and showing the automobile bumper and wheel lock and the mountings for connecting the automobile bumper and wheel lock to the automobile and showing the parts in locked positions.

Fig. 4 is a top plan view upon a reduced scale and showing a modified construction.

Fig. 5 is a fragmentary horizontal sectional detail showing how a locking dog engages a tire, the view being taken on the line 5—5 of Fig. 2 and looking in the direction indicated by the arrow 5 in Fig. 6.

Fig. 6 is a fragmentary view looking in the direction indicated by the arrow 6 in Fig. 5.

Fig. 7 is an enlarged horizontal sectional detail on a plane parallel with the axis of the bumper.

Fig. 8 is a vertical longitudinal sectional detail on the line 8—8 of Fig. 7 and looking in the direction indicated by the arrows.

Fig. 9 is a vertical cross section on the lines 9—9 of Figs. 7 and 10.

Fig. 10 is an enlarged fragmentary sectional detail on the same plane as Fig. 7 and on the line 10—10 of Fig. 9.

Fig. 11 is a side elevation of one of the connecting pinions shown in Fig. 10.

Fig. 12 is a sectional detail on the line 12—12 of Fig. 11.

Fig. 13 is a cross sectional detail on the lines 13—13 of Figs. 7 and 10.

Fig. 14 is a cross sectional detail on the lines 14—14 of Figs. 7 and 15.

Fig. 15 is a fragmentary sectional detail on the lines 15—15 in Fig. 14.

Fig. 16 is a perspective of one of the locking bars.

The brackets 1 and 2 have lower side faces 3 and 4 fitting against the side bars 5 and 6 of the automobile, and screws 7 are inserted upwardly through the flanges of the side bars and tapped into the brackets to hold the brackets in place.

Split clamping bearings 8 and 9 are formed at the front ends of the brackets 1 and 2 and have bolts 10 and 11 inserted upwardly through the lower members 12 and and 13 of the bearings and tapped into the upper members 14 and 15. The main bumper frame 16 is a heavy pipe fitting tightly in the bearings 8 and 9 so as to be rigidly clamped in place by tightening the bolts 10 and 11.

A sleeve 17 fits rotatably in the pipe 16 at the longitudinal center, rings 18 and 19 fit in the pipe against the ends of the sleeve 17, and the pins 20 and 21 are inserted tangentially through the pipe and cut into the sides of the rings 18 and 19 to hold the rings in place to hold the sleeve 17 from endwise movement.

Connecting pinions 22, 23 and 24 are mounted in the sleeve with the axes of the pinions crosswise of the axis of the sleeve. The sleeve 17 has a circular bore extending from end to end, and the pinions 22, 23 and 24 are circular concentric to their axes and are circular longitudinally of their axes, so that the end faces 25 and 26 fit in the sleeve 17. Pins 27 are inserted through the sleeve and through the pinions, and the gear teeth 28 are concentric to the pins 27. The gear racks 29 and 30 fit in the sleeve 17 against opposite sides of the pinions 22, 23 and 24, so that the racks are connected together by the pinions, and so that the racks will move in opposite directions.

The arms 31 and 32 extend from opposite ends of the racks 29 and 30. Stop pins 33 and 34 are fixed in the outer ends of the arms 31 and 32. The arms 31 and 32 are half round in cross section and the pins 33 and 34 extend from the flat sides. Square heads 35 and 36 extend outwardly from the outer ends of the arms 31 and 32 through bearings 37 and 38. The bearing 37 is a cap fitting upon the end of the pipe 16 and held in place by cap screws 39. The cap screws are inserted and tapped into the bearing so as to cut into the sides of the pipe 16 and then the outer faces 40 of the heads of the screws are ground off smooth so that the screws cannot be removed.

In a like manner the bearing 38 is a cap fitting upon the other end of the pipe 16 and held in place by screws 41. The lock housing 42 is formed integral with the bearing 37 and carries a locking dog 43 controlled by a key lock 44.

Notches 45 are formed in the head 35 to be engaged by the locking dog 43, so that when the head 35 is turned to the proper position and pushed into the bearing and the lock 44 operated the head 35 cannot be removed or pulled outwardly and the pinions 22, 23 and 24 hold the head 36 from being pulled outwardly.

When the lock 44 is unlocked to withdraw the dog 43 the heads 35 and 36 may be drawn outwardly beyond the bearings 37 and 38, and then the stops 33 and 34 will limit the outward movements of the arms 31 and 32, and then the heads 35 and 36 may be rotated to turn the tire engaging dogs downwardly out of engagement with the tires.

Curved necks 46 and 47 extend outwardly from the heads 35 and 36 and the tire engaging the dogs 48 and 49 are mounted in bifurcations in the outer ends of the necks 46 and 47 and secured in places by riveted pins 50 and 51. The tire engaging dogs 48 and 49 have teeth 52, 53, 54 and 55 facing each other and recesses 56 and 57 between the teeth, so that when the heads 35 and 36 are moved inwardly, as in Fig. 7, the teeth 52 and 53 will engage one tire 58, as shown in Fig. 5. The tooth 52 engages the outer side of the tire near the bead, and the tooth 53 engages the periphery of the tire or tread, the principal object being to prevent the front wheels from being guided and prevent the automobile being operated by an unauthorized person.

Expansive coil springs 59 are inserted into spring casings formed in the necks 46 and 47 to engage tongues 60 extending from the dogs 48 and 49 so as to make a slightly yielding connection between the necks 46 and 47 and the dogs 48 and 49. With the exception of a slight movement provided by the arrangement of the parts the dogs 48 and 49 are rigidly connected to the necks 46 and 47.

The bearings 37 and 38 have square or rectangular openings 61 and 62 in which the heads 35 and 36 fit non-rotatably. The racks 29 and 30 fit in the sleeve 17 so as to hold each other in line and so that when one is rotated the other is rotated.

Referring to the modification shown in Fig. 4, the tire engaging dogs 63 and 64 are formed integral with the necks 65 and 66 and the necks 65 and 66 are similar to the necks 46 and 47 and the remaining construction is the same as that already described. In other words, the tire engaging dogs 63 and 64 are rigid instead of being pivoted as the dogs 48 and 49 are pivoted.

In the use of the device, assuming it to be in the position as shown in Fig. 1, the bumper is unlocked at the end 37 and the telescoping number 48 is taken in hand and pulled outwardly which through the internal gear also moves the end 49 outwardly. The ends are then turned up one-fourth of a revolution backwardly and again shoved into the pipe 16 which causes the forked ends 48 and 49 to fit closely the tires of the front wheels. The device is then locked at the end of 37. When it is desired to operate the vehicle the bumper is unlocked, withdrawn slightly, turned downwardly and shoved inwardly and again locked thus when necessary forming an efficient lock against theft and at all times forming a proper bumper.

Various changes may be made without departing from the spirit of my invention as claimed.

I claim:

1. An automobile bumper and wheel lock comprising brackets adapted to be attached to the frame of an automobile, a pipe rigidly mounted in the forward ends of the brackets a sleeve rotatably mounted in the pipe and held against endwise movement, pinions mounted in the sleeve with the axes of the pinions crosswise of the axis of the sleeve, racks mounted in the sleeve and meshing with opposite sides of the pinions, arms extending from the racks, heads upon the outer ends of the arms, necks upon the outer ends of the heads, wheel locking dogs so connected to the necks that the locking dogs may be moved outwardly away from the wheels and moved inwardly to engage the wheels, and means for locking the dogs in engagement with the wheels.

2. An automobile bumper and wheel lock comprising brackets adapted to be attached to an automobile body and extend forwardly, a frame rigidly mounted in the forward ends of the brackets, and wheel locking dogs connected to the frame and adapted to be moved inwardly against the wheels and adapted to be moved outwardly and rotated away from the wheels and means for locking said dogs against the wheels when moved inwardly.

3. An automobile bumper and wheel lock including brackets adapted to be attached to the frame of an automobile, arms reciprocatively and turnably mounted in said brackets, dogs on the ends of said arms, means for reciprocating said rods to move said dogs to and away from the front wheels of the automobile, and means for locking said arms when moved inwardly and turned rearwardly into engagement with the front automobile wheels.

4. An automobile bumper and wheel lock including brackets adapted to be attached to the frame of an automobile, arms reciprocatively and turnably mounted on said brackets, dogs on the ends of said arms, said arms being normally moved inwardly and turned so that said dogs depend downwardly out of engagement with the front wheels of the automobile, said arms being adapted to be moved outwardly, turned rearwardly and then moved inwardly to bring said dogs into engagement with the front automobile wheels, and means for locking said arms with said dogs in engagement with said automobile wheels.

5. An automobile bumper and wheel lock including brackets adapted to be attached to the frame of an automobile, a tube rigidly mounted on the forward end of said brackets, a sleeve turnably mounted in said sleeve, two arms in said tube, pinions mounted in said sleeve, a rack on each arm engaging opposite sides respectively of said pinions, bearings on the ends of said tubes, heads on the outer ends of said arms mounted in said bearings, said heads and said bearings having flat engaging surfaces to prevent turning of said arms, dogs on the ends of said arms, said arms being normally moved inwardly and turned so that said dogs rest downwardly and said flat head and bearing surfaces engage and prevent turning of the arms and dogs, said arms being adapted to be moved outwardly until said flat head and bearing surfaces disengage and turn rearwardly and then moved inwardly until said dogs engage the front wheels of the automobile and said flat head and bearing surfaces engage and prevent said rods from turning and said dogs disengaging said wheels, and means for locking said arms with said dogs in engagement with said wheels.

In testimony whereof I have signed my name to this specification.

W. D. GOZA.